United States Patent
Janakiraman et al.

(10) Patent No.: US 12,359,627 B2
(45) Date of Patent: Jul. 15, 2025

(54) CHEMISTRIES, APPLICATION, AND DELIVERY METHODS FOR COKE INHIBITION IN FUEL AND OIL SYSTEMS

(71) Applicant: General Electric Company, Schenectady, NY (US)

(72) Inventors: Narayanan Janakiraman, Bengaluru (IN); Arundhati Sengupta, Bengaluru (IN); Lawrence B. Kool, Clifton Park, NY (US); Karthick Gourishankar, Bengaluru (IN); Sanjay Kumar Sondhi, Bengaluru (IN)

(73) Assignee: GENERAL ELECTRIC COMPANY, Evendale, OH (US)

( * ) Notice: Subject to any disclaimer, the term of this patent is extended or adjusted under 35 U.S.C. 154(b) by 265 days.

(21) Appl. No.: 17/815,640

(22) Filed: Jul. 28, 2022

(65) Prior Publication Data
US 2023/0304445 A1    Sep. 28, 2023

(30) Foreign Application Priority Data

Mar. 22, 2022 (IN) ............................. 202211015708

(51) Int. Cl.
*F02C 7/30* (2006.01)
*C10G 29/20* (2006.01)
(Continued)

(52) U.S. Cl.
CPC ................ *F02C 7/30* (2013.01); *C10G 29/20* (2013.01); *C10L 1/305* (2013.01); *C10L 10/04* (2013.01);
(Continued)

(58) Field of Classification Search
CPC ............ C10N 2030/50; C10N 2040/25; C10N 2010/10; C10N 2040/135; C10N 2030/78;
(Continued)

(56) References Cited

U.S. PATENT DOCUMENTS

| | | | |
|---|---|---|---|
| 3,557,232 A | 1/1971 | Starnes, Jr. | |
| 4,122,033 A | 10/1978 | Black | |

(Continued)

FOREIGN PATENT DOCUMENTS

| | | | |
|---|---|---|---|
| CN | 101065390 A | 10/2007 | |
| CN | 102453119 A | 5/2012 | |

(Continued)

OTHER PUBLICATIONS

Spadaccini et a., On-Line Fuel Deoxygenation for Coke Suppression, Jul. 2003. (Year: 2003).*

(Continued)

*Primary Examiner* — Vishal V Vasisth
(74) *Attorney, Agent, or Firm* — Venable LLP; David D. Leege; Michele V. Frank

(57) ABSTRACT

An organometallic chemistry-based compound for preventing coke formation in a hydrocarbon fluid system. The organometallic chemistry-based compound includes a coordination complex that interrupts an autoxidative pathway of coke formation. A component and a system for mitigating coke formation during delivery or circulation of a hydrocarbon fluid. The component includes a contact surface configured to be in contact with the hydrocarbon fluid. The contact surface is functionalized with an inhibitor ligand to form an inhibitor ligand-functionalized surface. The inhibitor ligand-functionalized surface interrupts an autoxidative pathway of coke formation.

9 Claims, 5 Drawing Sheets

(51) Int. Cl.

| | | |
|---|---|---|
| *C10L 1/30* | (2006.01) | |
| *C10L 10/04* | (2006.01) | |
| *C10M 135/14* | (2006.01) | |
| *F02C 7/06* | (2006.01) | |
| *F02C 7/22* | (2006.01) | |
| *F16N 7/40* | (2006.01) | |
| *C10N 30/00* | (2006.01) | |
| *C10N 40/00* | (2006.01) | |

(52) U.S. Cl.
CPC ............ *C10M 135/14* (2013.01); *F02C 7/06* (2013.01); *F02C 7/22* (2013.01); *F16N 7/40* (2013.01); *C10G 2300/1051* (2013.01); *C10G 2300/708* (2013.01); *C10G 2400/08* (2013.01); *C10L 2200/043* (2013.01); *C10L 2230/04* (2013.01); *C10L 2270/04* (2013.01); *C10M 2203/003* (2013.01); *C10M 2219/062* (2013.01); *C10N 2030/78* (2020.05); *C10N 2040/135* (2020.05)

(58) Field of Classification Search
CPC ............ C10N 2040/12; C10N 2010/02; C10N 2010/16; C10N 2040/04; C10N 2010/04; C10N 2010/14; C10N 2010/12; C10G 29/20; C10G 2300/708; C10G 2400/08; C10G 2300/1051; F16N 7/40; C10M 159/18; C10M 177/00; C10M 135/14; C10M 2219/062; C10M 2215/20; C10M 2219/088; C10M 2215/06; C10M 2215/061; C10M 2207/144; C10M 2215/02; C10M 2203/003; C10M 2223/061; F02C 7/22; F02C 7/30; F02C 7/06; C10L 10/04; C10L 1/305; C10L 1/301; C10L 2270/04; C10L 2230/04; C10L 2200/043

See application file for complete search history.

(56) References Cited

U.S. PATENT DOCUMENTS

| | | | |
|---|---|---|---|
| 4,427,560 | A | 1/1984 | Holstedt et al. |
| 4,500,602 | A | 2/1985 | Patten et al. |
| 4,567,251 | A | 1/1986 | Balas |
| 5,725,955 | A | 3/1998 | Tawil et al. |
| 5,759,622 | A | 6/1998 | Stover |
| 6,884,467 | B2 | 4/2005 | Walker et al. |
| 7,484,672 | B2 | 2/2009 | Campion et al. |
| 7,641,941 | B2 | 1/2010 | Mazany et al. |
| 8,128,887 | B2 | 3/2012 | Bradley et al. |
| 8,401,169 | B2 | 3/2013 | Ku et al. |
| 9,033,256 | B2 | 5/2015 | Imoehl |
| 9,194,280 | B2 | 11/2015 | Berkemeier et al. |
| 10,844,788 | B2 | 11/2020 | Zhang et al. |
| 11,168,643 | B2 | 11/2021 | Lineton et al. |
| 2004/0188323 | A1 | 9/2004 | Tzatzov et al. |
| 2007/0264491 | A1 | 11/2007 | Asano et al. |
| 2009/0048130 | A1 | 2/2009 | Habeeb et al. |
| 2009/0221460 | A1* | 9/2009 | Habeeb ................ C10M 163/00 508/370 |
| 2010/0266770 | A1 | 10/2010 | Mazany et al. |
| 2011/0100015 | A1 | 5/2011 | Alagappan et al. |
| 2012/0125844 | A1 | 5/2012 | Dongare et al. |
| 2014/0227511 | A1 | 8/2014 | Mazany |
| 2016/0272818 | A1 | 9/2016 | Morris |
| 2017/0267595 | A1 | 9/2017 | Mazany |
| 2020/0024554 | A1 | 1/2020 | White et al. |

FOREIGN PATENT DOCUMENTS

| | | |
|---|---|---|
| CN | 107636133 A | 1/2018 |
| CN | 107641788 A | 1/2018 |
| CN | 111040480 B | 8/2021 |
| EP | 1016736 A1 | 7/2000 |
| EP | 0874066 B1 | 8/2002 |
| GB | 1000477 A | 8/1965 |
| WO | 84/01169 A1 | 3/1984 |
| WO | 2020/180774 A1 | 9/2020 |

OTHER PUBLICATIONS

Sengupta et al., "Zn2+—Silica Modified Cobalt Ferrite Magnetic Nanostructured Composite for Efficient Adsorption of Cationic Pollutants from Water," ACS Sustainable Chemistry & Engineering, vol. 5, pp. 1280-1286 (2017).

Dai et al., "Dually Charged MOF-Based Thin-Film Nanocomposite Nanofiltration Membrane for Enhanced Removal of Charged Pharmaceutically Active Compounds," Environmental Science & Technology, vol. 54, pp. 7619-7628 (2020).

Cheng et al., "Positively charged microporous ceramic membrane for the removal of Titan Yellow through electrostatic adsorption," Journal of Environmental Sciences, vol. 44, pp. 204-212 (2016).

Wei et al., "Negatively charged polyimide nanofiltration membranes with high selectivity and performance stability by optimization of synergistic imidization," Journal of Membrane Science, vol. 563, pp. 752-761 (2018).

Speight, "The chemistry and physics of coking," Korean Journal of Chemical Engineering, vol. 15, pp. 1-8 (1998).

Jia et al., "A comprehensive review of the thermal oxidation stability of jet fuels," Chemical Engineering Science, vol. 229, 116157, pp. 1-23 (2021).

Betts et al., "The conversion of metal catalysts into inhibitors of autoxidation," Die Makromolekulare Chemie, vol. 95, pp. 22-39 (1966).

Copping et al., "Catalytic and inhibitory effects of metal chelates in autoxidation reaction," Discussions of the Faraday Society, vol. 46, pp. 202-212 (1968).

Watkinson et al., "Chemical reaction fouling: A review," Experimental Thermal and Fluid Science, vol. 14, pp. 361-374 (1997).

\* cited by examiner

US 12,359,627 B2

CHEMISTRIES, APPLICATION, AND DELIVERY METHODS FOR COKE INHIBITION IN FUEL AND OIL SYSTEMS

CROSS REFERENCE TO RELATED APPLICATIONS

The present application claims the benefit of Indian Patent Application No. 202211015708, filed on Mar. 22, 2022, which is hereby incorporated by reference herein in its entirety.

TECHNICAL FIELD

The present disclosure relates to compositions, components, and systems in contact with hydrocarbon fluids, particularly, compositions and components for gas turbine engines for aircraft, and methods of preparing the same.

BACKGROUND

Gas turbine engines include surfaces that contact hydrocarbon fluids, such as fuels and lubricating oils. Carbonaceous deposits (also known as coke) may form on these surfaces when exposed to the hydrocarbon fluids at elevated temperatures, resulting in carbon becoming attached and building up as deposits on surfaces contacted by a fuel or oil, leading to reduced flow or flow blockage.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Figure 1:
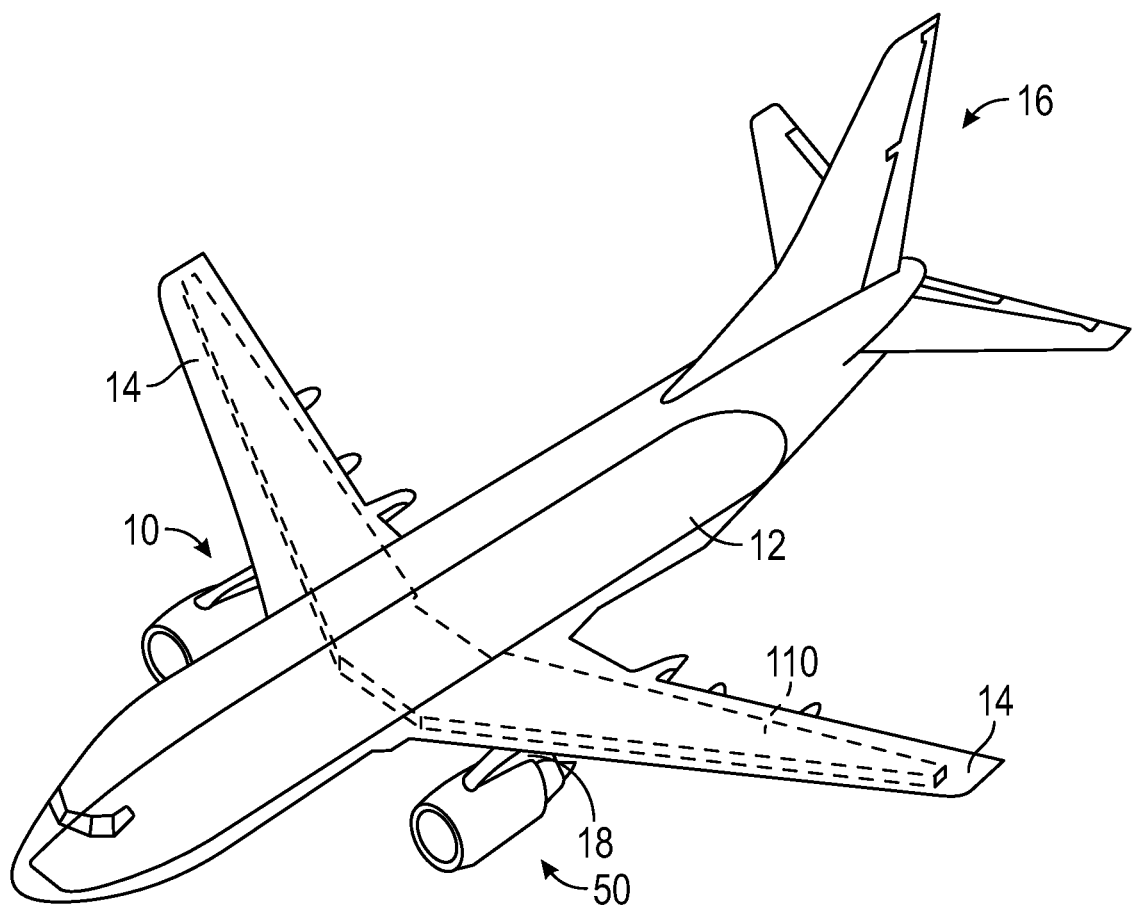
FIG. 1 is a schematic perspective view of an aircraft having a component for mitigating coke formation during delivery of a hydrocarbon fluid, according to an embodiment of the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

The terms "upstream" and "downstream" refer to the relative direction with respect to fluid flow in a fluid pathway. For example, "upstream" refers to the direction from which the fluid flows, and "downstream" refers to the direction to which the fluid flows. The term "fluid" may be a gas or a liquid. The term "fluid communication" means that a fluid is capable of making the connection between the areas specified.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

As used herein, the terms "first," "second," and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a 1, 2, 4, 5, 10, 15, or 20 percent margin in either individual values, range(s) of values and/or endpoints defining range(s) of values. Here and throughout the specification and claims, range limitations may be combined and/or interchanged. Such ranges are identified and include all the sub-ranges contained therein unless context or language indicates otherwise.

As used herein, the term "$M^{n+}$" refers to a metal ion having n number of charges. Similarly, the term "$M^{(n+1)+}$" refers to a metal ion having (n+1) number of charges.

As used here, the term "organometallic chemistry-based compound" refers to an organometallic compound or a coordination compound that include at least one chemical bond between a metal and an organic ligand. The organic ligand may contain one or more heteroatoms such as oxygen, nitrogen, sulfur, or phosphorus.

Various embodiments are discussed in detail below. While specific embodiments are discussed, this is done for illustration purposes only. A person skilled in the relevant art will recognize that other components and configurations may be used without departing from the spirit and the scope of the present disclosure.

As noted above, coke deposition may occur on surfaces of a gas turbine engine that are exposed to hydrocarbon fluids, such as fuels and lubricating oils, at elevated temperatures. Such carbon deposits may develop if the fluid circuit is operated or closed without the remaining stagnant fuel being purged. As the deposits collect, they can become sufficiently large to reduce or even to obstruct fluid flow. In the case of a fuel circuit, such carbon deposition can lead to degraded engine performance, reduced heat transfer efficiencies, increased pressure drops, and increased rates of material erosion, all of which can necessitate the use of expensive de-coking procedures and even replacement of fuel nozzles. The present disclosure discusses ways to prevent such carbon deposits on a surface of a component that contacts hydrocarbon fluids, and, particularly, to such components used in a gas turbine engine for an aircraft. Aspects described herein relate to compositions, components, systems, and methods for preventing carbon deposits from hydrocarbon fluids at elevated temperatures. In particular, the embodiments relate to modifying an internal surface wetted by, or in contact with, the hydrocarbon fluid.

Coke formation involves certain autoxidative pathways involving initiation, propagation, and termination reactions in the presence of oxygen.

Initiation $$RH \rightarrow R\cdot \quad [\text{Reaction 1}]$$

$$ROOH \rightarrow RO\cdot + OH\cdot \quad [\text{Reaction 2}]$$

$$2ROOH \rightarrow RO_2\cdot + RO\cdot + H_2O \quad [\text{Reaction 3}]$$

Propagation $$R\cdot + O_2 \rightarrow RO_2\cdot \quad [\text{Reaction 4}]$$

$$RO_2\cdot + RH \rightarrow ROOH + R\cdot \quad [\text{Reaction 5}]$$

$$RO_2\cdot + RH \rightarrow ROOR\cdot \quad [\text{Reaction 6}]$$

$$RO\cdot + RH \rightarrow \text{radicals, products} \quad [\text{Reaction 7}]$$

Termination $$R\cdot + R\cdot \rightarrow \text{products} \quad [\text{Reaction 8}]$$

$$R\cdot + RO_2\cdot \rightarrow \text{products} \quad [\text{Reaction 9}]$$

$$RO_2\cdot + RO_2\cdot \rightarrow \text{products} \quad [\text{Reaction 10}]$$

Certain chemistries according to the present disclosure inhibit coke formation by interrupting one or more of the above autoxidative pathways in hydrocarbon fluids. In an embodiment, an organometallic chemistry-based compound or an $M^{n+}$ based inhibitor can interrupt one or more of the autoxidative pathways as follows:

$$RO_2\cdot + M^{n+} \rightarrow M^{(n+1)+} + \text{products} \quad [\text{Reaction 11}]$$

$$R\cdot + M^{(n+1)+} \rightarrow M^{n+} + \text{products} \quad [\text{Reaction 12}]$$

The involvement of the organometallic chemistry-based compound or the $M^{n+}$ based inhibitor prevents hydrocarbon radical intermediates generated by initiation reactions from undergoing further propagation or termination reactions. In an embodiment, the organometallic chemistry-based compound or the $M^{n+}$ based inhibitor essentially serves as a catalyst, that is, the inhibitor is not subject to consumption. Accordingly, trace quantities (on the order of parts per billion (ppb) or a few parts per million (ppm)) of the organometallic chemistry-based compound or the $M^{n+}$ based inhibitor present in the hydrocarbon fluid would be sufficient for coke inhibition. In an embodiment, the organometallic chemistry-based compound or the $M^{n+}$ based inhibitor has a concentration ranging between 100 ppb and 750 ppm, alternatively, between 500 ppb and 400 ppm, alternatively, between 1 ppm and 300 ppm, or alternatively, between 10 ppm and 90 ppm. Such concentration may depend on the oxygen concentration (for example, ranging between 0.1 ppm and 75 ppm) present in the hydrocarbon fluid. In addition, the organometallic chemistry-based compound or the $M^{n+}$ based inhibitor may form an adduct with ROOH or cause decomposition of ROOH via a non-radical mechanism, thereby, reducing free radicals in the system. Coke deposition on internal surfaces of fuel and oil system components such as flow path, valves, and nozzles leads to reduced fuel flow and/or flow blockage resulting in system performance, maintenance, and safety issues. Coking occurs due to free-radical-induced autoxidation of hydrocarbon fluids in the presence of oxygen or due to heteroatom-induced polymerization. The disclosure describes the application and delivery of selected organometallic chemistries to inhibit coke particle formation in bulk hydrocarbon fluids and coke deposition on the above-mentioned internal surfaces.

Embodiments of the present disclosure relate to certain organometallic chemistries that inhibit coke formation, a delivery mechanism for these coke inhibiting chemistries, and/or coke inhibiting chemistries on target surfaces. These organometallic chemistries, including the organometallic chemistry-based compound or the $M^{n+}$ based inhibitor, interrupt the autocatalyzed coke formation reactions, by minimizing the concentration of free radicals R· and $RO_2$· under a wide range of temperature (for example, ranging between twenty-five to four hundred thirty deg. C., alternatively, between fifty to three hundred deg. C., or alternatively, between ninety and two hundred deg. C., alternatively, between twenty-five to one hundred deg. C., alternatively, between one hundred to two hundred deg. C., alternatively, between two hundred to three hundred deg. C., alternatively, between three hundred to four hundred thirty deg. C., alternatively, between two hundred to four hundred thirty deg. C., or alternatively, between two hundred thirty to four hundred thirty deg. C.), pressure (for example, up to 30 bar) and oxygen levels (for example, ranging between 0.1 ppm and 75 ppm). Applications of these $M^{n+}$ based inhibitors include aviation or land-based hydrocarbon fluid delivery systems and nozzle assemblies, which may exist as hydrocarbon fluid additives, metal surface coatings, or controlled release capsules. These organometallic chemistries, including the organometallic chemistry-based compound or the $M^{n+}$ based inhibitor, can survive operating temperatures up to about four hundred thirty deg. C. and are useful under various oxygen levels ranging between 0.1 ppm and 75 ppm.

The components, systems, and methods discussed herein are particularly suitable for use in engines, such as a gas turbine engine used on an aircraft. FIG. 1 is a perspective view of an aircraft 10 that may implement various aspects of the present disclosure. The aircraft 10 includes a fuselage 12, wings 14 attached to the fuselage 12, and an empennage 16. The aircraft 10 also includes a propulsion system that produces a propulsive thrust required to propel the aircraft 10 in flight, during taxiing operations, and the like. The propulsion system for the aircraft 10 shown in FIG. 1 includes a pair of engines 50. In this embodiment, each engine 50 is attached to one of the wings 14 by a pylon 18 in an under-wing configuration. Although the engines 50 are shown attached to the wing 14 in an under-wing configuration in FIG. 1, in other embodiments, the engine 50 may have alternative configurations and be coupled to other portions of the aircraft 10. For example, the engine 50 may additionally or alternatively include one or more aspects coupled to other parts of the aircraft 10, such as, for example, the empennage 16, and the fuselage 12.

As will be described further below with reference to FIG. 2, the engines 50 shown in FIG. 1 are gas turbine engines that are each capable of selectively generating a propulsive thrust for the aircraft 10. The amount of propulsive thrust may be controlled at least in part based on a volume of fuel provided to the engines 50 via a fuel system 100. An aviation turbine fuel in the embodiments discussed herein is a combustible hydrocarbon liquid fuel, such as a kerosene-type fuel, having a desired carbon number, Jet A, JetA1, JP-8, JP8+100, JP-5, Sustainable Aviation Fuel (SAF), and deoxygenated fuel. The fuel is stored in a fuel tank 110 of the fuel system 100. As shown in FIG. 1, at least a portion of the fuel tank 110 is located in each wing 14 and a portion of the fuel tank 110 is located in the fuselage 12 between the wings 14. The fuel tank 110, however, may be located at other suitable locations in the fuselage 12 or the wing 14. The fuel tank 110 may also be located entirely within the fuselage 12 or the wing 14. The fuel tank 110 may also be separate tanks instead of a single, unitary body, such as, for example, two tanks each located within a corresponding wing 14.

Although the aircraft 10 shown in FIG. 1 is an airplane, the embodiments described herein may also be applicable to other aircraft 10, including, for example, helicopters and unmanned aerial vehicles (UAV). Preferably, the aircraft discussed herein are fixed-wing aircraft or rotor aircraft that generate lift by aerodynamic forces acting on, for example, a fixed wing (e.g., wing 14) or a rotary wing (e.g., rotor of a helicopter), and are heavier-than-air aircraft, as opposed to lighter-than-air aircraft (such as a dirigible).

Figure 2:
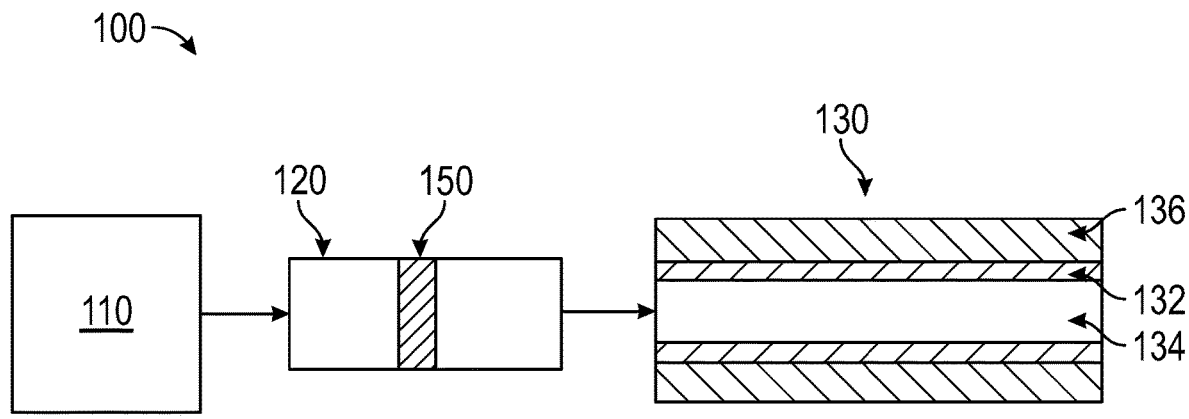
FIG. 2 is a schematic view of a fuel system for mitigating coke formation during delivery of a hydrocarbon fluid, according to an embodiment of the present disclosure.

As shown in FIG. 2, the engine 50 is operable with the fuel system 100 and receives a flow of fuel from the fuel system 100. The fuel system 100 includes a fuel delivery assembly 120, in fluid contact downstream of the fuel tank 110, providing the fuel flow from the fuel tank 110 to the engine 50. The fuel delivery assembly 120 includes tubes, pipes, and the like, to fluidly connect the various components of the fuel system 100 to the engine 50. The fuel system 100 may also include a fuel pump (not shown) in fluid connection with the fuel in the fuel delivery assembly 120. The fuel pump is used to induce the flow of the fuel through the fuel delivery assembly 120 to the engine 50. The fuel pump may generally be the primary source of pressure rise in the fuel delivery assembly 120 between the fuel tank 110 and the engine 50. In an embodiment, the fuel delivery assembly 120 includes a controlled release assembly 150 that is capable of releasing the organometallic chemistry-based compound or the $M^{n+}$ based inhibitor in a controlled manner into the fuel.

Fuel is injected via the nozzle assembly 130, in fluid contact downstream of the fuel delivery assembly 120, into compressed air and mixed with the compressed, primary air. The nozzle assembly 130 injects fuel into the turbulent airflow of the primary air and the turbulence promotes rapid mixing of the fuel with the primary air. The mixture of the fuel and compressed air is combusted in the combustion chamber, generating combustion gases (combustion products), which accelerate as the combustion gases leave the combustion chamber. The products of combustion are accelerated as the products are expelled through the outlet of the combustion chamber to drive the engine 50. Non-limiting examples of the fuel include Jet A, JetA1, JP-8, JP8+100, JP-5, SAF and deoxygenated fuel synthesized from various non-fossil sources such as biofuels.

Figure 3:
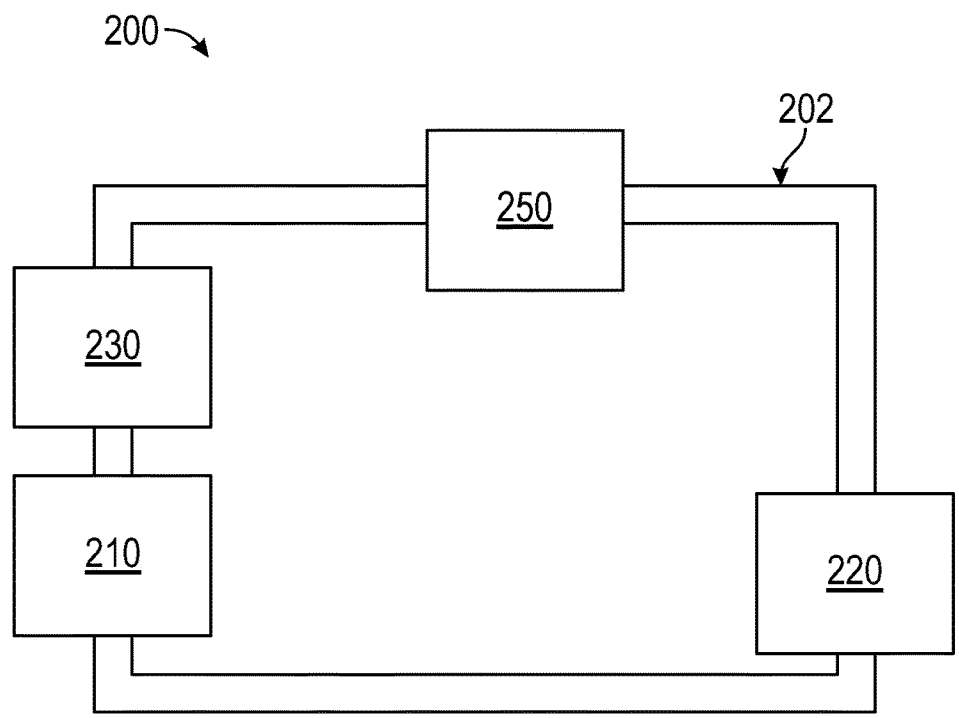
FIG. 3 is a schematic view of a lubrication system for mitigating coke formation during delivery of a hydrocarbon fluid, according to an embodiment of the present disclosure.

The engine 50 also includes various accessory systems to aid in the operation of the engine 50 and/or an aircraft including the engine 50. As shown in FIG. 3, for example, the engine 50 may include a lubrication system 200 configured to provide a lubricant to, for example, bearings and gear meshes located at various lubrication-requiring components 220 of the engine 50. The lubricant provided by the lubrication system 200 may increase the useful life of such lubrication-requiring components 220 and may remove a certain amount of heat from such components 220. In addition, the lubrication system 200 provides lubrication to an electronic generator (not shown), as well as cooling/heat removal for the electronic generator. The electronic generator may provide electrical power to, for example, a startup electrical motor for the engine 50 and/or various other electronic components of the engine 50 and/or an aircraft including the engine 50.

The lubrication system 200 is a closed fluid circuit, including an oil tank 210 providing the oil flow from the oil tank 210 to the lubrication-requiring components 220. The lubrication system 200 includes tubes and pipes 202, to fluidly connect various components of the lubrication system 200. The lubrication system 200 may also include an oil pump 230. The oil pump 230 is used to induce the flow of the oil through the closed fluid circuit of the lubrication system 200. The oil pump 230 may generally be the primary source of pressure rise in the lubrication system 200. In an embodiment, the lubrication system 200 includes a controlled release assembly 250 that is capable of releasing the organometallic chemistry-based compound or the $M^{n+}$ based inhibitor in a controlled manner into the oil.

The lubrication systems 200 for the engine 50 may use hydrocarbon fluids, such as oil, for lubrication, in which the oil circulates through inner surfaces of oil scavenge lines. Non-limiting examples of the oil include lubrication oils used in aviation turbines such as type-II oil covered by MIL-PRF-23699 and SAE AS5780 specifications, lubrication oils used in land and sea-based power turbines, and engine and gearbox lubrication oils used in automobiles.

The engine 50 discussed herein is provided by way of example only. In other embodiments, any other suitable engine may be utilized with aspects of the present disclosure. For example, in other embodiments, the engine may be any other suitable gas turbine engine, such as a turbofan engine, a turboshaft engine, a turboprop engine, a turbojet engine, and the like. In such a manner, in other embodiments, the gas turbine engine may have other suitable configurations, such as other suitable numbers or arrangements of shafts, compressors, turbines, fans, etc. In some embodiments, the engine 50 may be a direct drive, fixed-pitch turbofan engine. In other embodiments, a gas turbine engine may be a geared gas turbine engine, may be a variable pitch gas turbine engine, etc. Further, still, in alternative embodiments, aspects of the present disclosure may be incorporated into, or otherwise utilized with, any other type of engine, such as reciprocating engines, as discussed above. Additionally, in still other exemplary embodiments, the exemplary engine 50 may include or be operably connected to any other suitable accessory systems. Additionally, or alternatively, the exemplary engine 50 may not include or be operably connected to one or more of the accessory systems discussed above.

As noted above, various components of the engine 50 contact a hydrocarbon fluid (e.g., fuels and oils) at elevated temperatures and at various oxygen levels. As shown, for example, in FIG. 2, various components of the fuel system 100 are in contact with the hydrocarbon fluid. As shown, for example, in FIG. 3, various components of the lubrication system 200 are in contact with the hydrocarbon fluid. The component may be, for example, the tank 110, the fuel delivery assembly 120, the nozzle assembly 130, the oil tank 210, the lubrication-requiring components 220, the oil pump 230, and/or any other component that is configured to be in contact with a hydrocarbon fluid, whether that component is in the engine 50 or another system.

As shown, for example, in FIG. 2, the nozzle assembly 130 includes a fluid passage 134 through which the hydrocarbon fluid is located and flows, as well as a containment wall 136. The containment wall 136 includes a contact surface 132. This contact surface 132 may form the boundary of the fluid passage 134 and, thus, may be a wetted surface or a contact surface that is wetted/contacted by the hydrocarbon fluid in the fluid passage 134. The contact surface 132 can include a cobalt-chrome alloy, a cobalt-based alloy, a nickel-based alloy, an iron-based alloy or other suitable materials that are capable of withstanding high temperatures. Non-limiting examples of cobalt-chrome alloys include stellites such as Stellite-6B. Non-limiting examples of cobalt-based alloys include Haynes® 188. Non-limiting examples of nickel-based alloys include Inconel® 600, Inconel® 625, Inconel® 718, Inconel® X-750, Rene N2, N4, N5, N500, and Hastelloy® X. Non-limiting examples of iron-based alloys include stainless steel such as SS-304, SS-316, SS-340, SS-321, and SS-440. One skilled in the art would recognize that certain alloys such as Rene N5, N500, N4, N2, Inconel® 718, Hastelloy® X, and Haynes® 188 are known as superalloys that are capable of withstanding high operating temperatures. Similarly, the tubes and pipes 202 of the lubrication system 200 shown, for example, in FIG. 3 includes a fluid passage (not shown) through which the hydrocarbon fluid is located and flows, as well as a containment wall (not shown), which includes a contact surface (not shown) that may form the boundary of the fluid passage and, thus, may be a wetted surface or a contact surface that is wetted/contacted by the hydrocarbon fluid in the fluid passage.

Figure 4A:
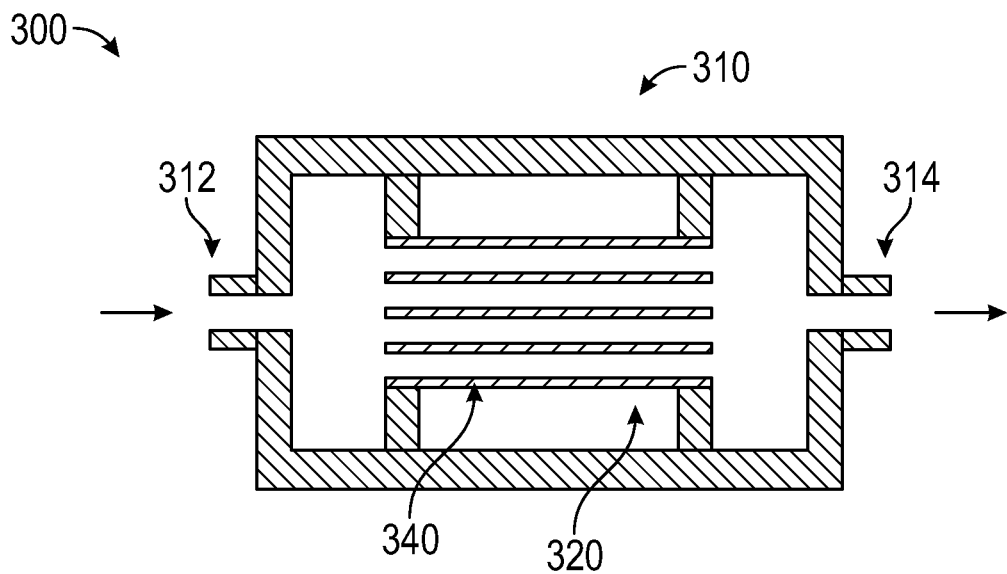
FIG. 4A and FIG. 4B are schematic views of controlled release assemblies for mitigating coke formation during delivery of a hydrocarbon fluid, according to an embodiment of the present disclosure.

FIG. 4A shows a controlled release assembly 300 based on a porous material 320 containing the organometallic chemistry-based compound or the $M^{n+}$ based inhibitor 340. The controlled release assembly 300 includes a metal enclosure 310 having a fluid entrance 312 and a fluid exit 314. The hydrocarbon fluid enters the interior of the metal enclosure 310 via the fluid entrance 312, makes contact with one or more layers of the porous material 320, and exits the interior of the metal enclosure 310 via the fluid exit 314. Non-limiting examples of materials used for the porous material 320 include glass, ceramics, metals, and polymers, such as cellulose acetate, nitrocellulose, cellulose esters, polysulfone, polyether sulfone, polyacrylonitrile, polyamide, polyimide, polyethylene, polypropylene, polytetrafluoroethylene, polyvinylidene fluoride, and polyvinylchloride. These materials may undergo certain processes to create the porous structure, such as powder sintering or polymeric sponge replication. Subsequently, impregnation of the organometallic chemistry-based compound or the $M^{n+}$ based inhibitor to the porous structure occurs using certain processes such as melt impregnation and cooling, or slurry/solution impregnation and drying. Without being bound by any theory, the release rate of the organometallic chemistry-based compound or the $M^{n+}$ based inhibitor into the hydrocarbon fluid is regulated by the exposed surface area of the porous material 320 containing the organometallic chemistry-based compound or the $M^{n+}$ based inhibitor and the fuel flow rate through the controlled release assembly 300.

Figure 4B:
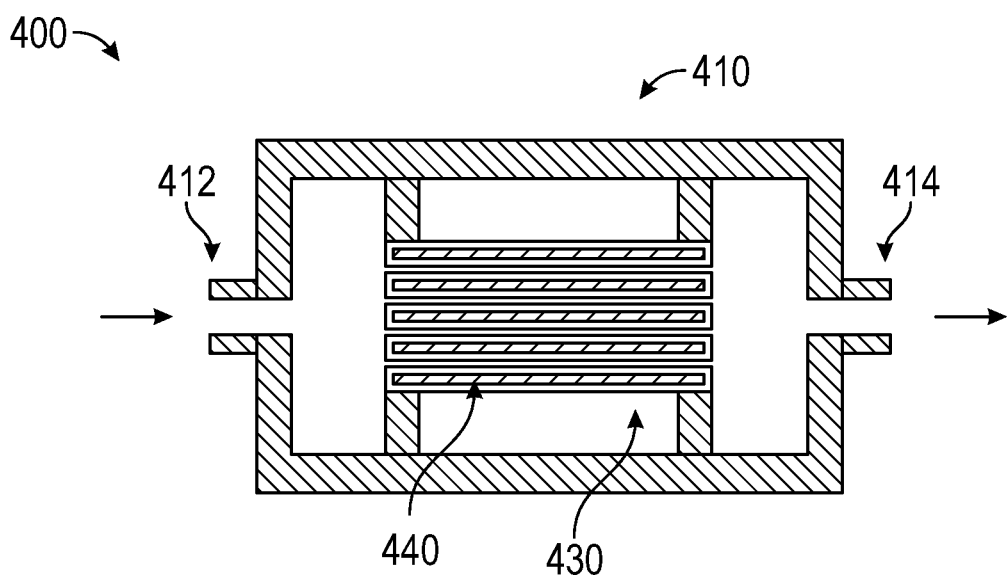

FIG. 4B shows a controlled release assembly 400 based on a semipermeable membrane enclosure 430 encapsulating the organometallic chemistry-based compound or the $M^{n+}$ based inhibitor 440. The controlled release assembly 400 includes a metal enclosure 410 having a fluid entrance 412 and a fluid exit 414. The hydrocarbon fluid enters the interior of the metal enclosure 410 via the fluid entrance 412, makes contact with one or more layers of the semipermeable membrane enclosure 430, and exits the interior of the metal enclosure 410 via the fluid exit 414. Non-limiting examples of materials used for the semipermeable membrane enclosure 430 include ceramics and polymers such as cellulose acetate, nitrocellulose, cellulose esters, polysulfone, polyether sulfone, polyacrylonitrile, polyamide, polyimide, polyethylene, polypropylene, polytetrafluoroethylene, polyvinylidene fluoride, and polyvinylchloride. Without being bound by any theory, the release rate of the organometallic chemistry-based compound or the $M^{n+}$ based inhibitor into the hydrocarbon fluid is regulated by the hydrocarbon solubility of the organometallic chemistry-based compound or the $M^{n+}$ based inhibitor and the fuel flow rate through the controlled release assembly 400.

In an embodiment, the organometallic chemistry-based compound or the $M^{n+}$ based inhibitor exists in isolated form. Non-limiting examples of the organometallic chemistry-based compound or the $M^{n+}$ based inhibitor existing in isolated form include coordination complexes (having inhibitor ligands) of $M(BuSal)_n$ (including $Co(BuSal)_2$, $Cu(BuSal)_2$, and $Zn(BuSal)_2$), $M(PhSal)_n$ (including $Co(PhSal)_2$), $M(DIPS)_n$ (including $Co(DIPS)_2$, $Cu(DIPS)_2$, $Ni(DIPS)_2$, $Cr(DIPS)_3$), $[(BuP)_m M(DG)]^{n+}$ (including $[(BuP)_2 Co(DG)]^{n+}$), and $M(bis$-$dithione)_n$ complexes (including $NiS_4C_4Ph_4$, $PdS_4C_4Ph_4$, $PtS_4C_4Ph_4$, $CoS_4C_4Ph_4$, $CoS_4C_4(p$-$tolyl)_4$, $CoS_4C_4(p$-$anisyl)_4$, $CoS_4C_4Ph_4 \cdot PPh_3$, and $CoS_4C_4Ph_4 \cdot PBu_3$, where Ph denotes a phenyl group and Bu denotes a butyl group). Non-limiting examples of M include Ni, Co, Fe, Cu, Zn, V, Re, Pt, Pd, Os, Ru, Cr, Mo, and W. BuSal refers to a N-butylsalicylaldimino ligand having a representative structure of:

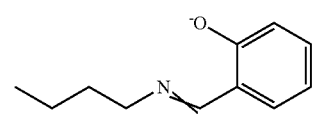

[Formula 1]

and includes conjugate acids thereof. PhSal refers to a N-phenylsalicylaldimino ligand having a representative structure of:

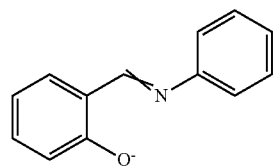

[Formula 2]

and includes conjugate acids thereof. DIPS refers to a 3,5-diisopropylsalicylato ligand having a representative structure of:

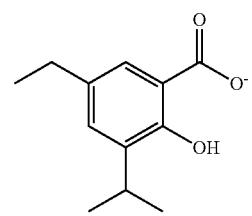

[Formula 3]

and including conjugate acids thereof. BuP refers to an N-butylphosphonium ligand having a representative structure of:

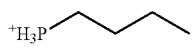
[Formula 4]

and including conjugate bases thereof. DG refers to a dimethylglyoxime ligand having a representative structure of:

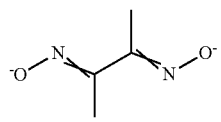
[Formula 5]

and including conjugate acids thereof. The bis-dithione ligand has a representative structure of:

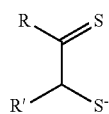
[Formula 6]

and includes conjugate acids thereof. Each of R and R are independently hydrogen or aryl or alkyl groups, substituted or unsubstituted. Non-limiting examples of aryl or alkyl groups include phenyl, methyl, ethyl, n-propanyl, and p-$ClC_6H_4$.

The M(bis-dithione)$_n$ complex has a structure of:

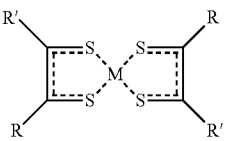
[Formula 7]

where each of R and R' are independently hydrogen or aryl or alkyl groups, substituted or unsubstituted. Non-limiting examples of aryl or alkyl groups include phenyl, methyl, ethyl, n-propanyl, p-$CH_3C_6H_4$ (p-tolyl), p-$OCH_3C_6H_4$ (p-anisyl), and p-$ClC_6H_4$.

Figure 5:
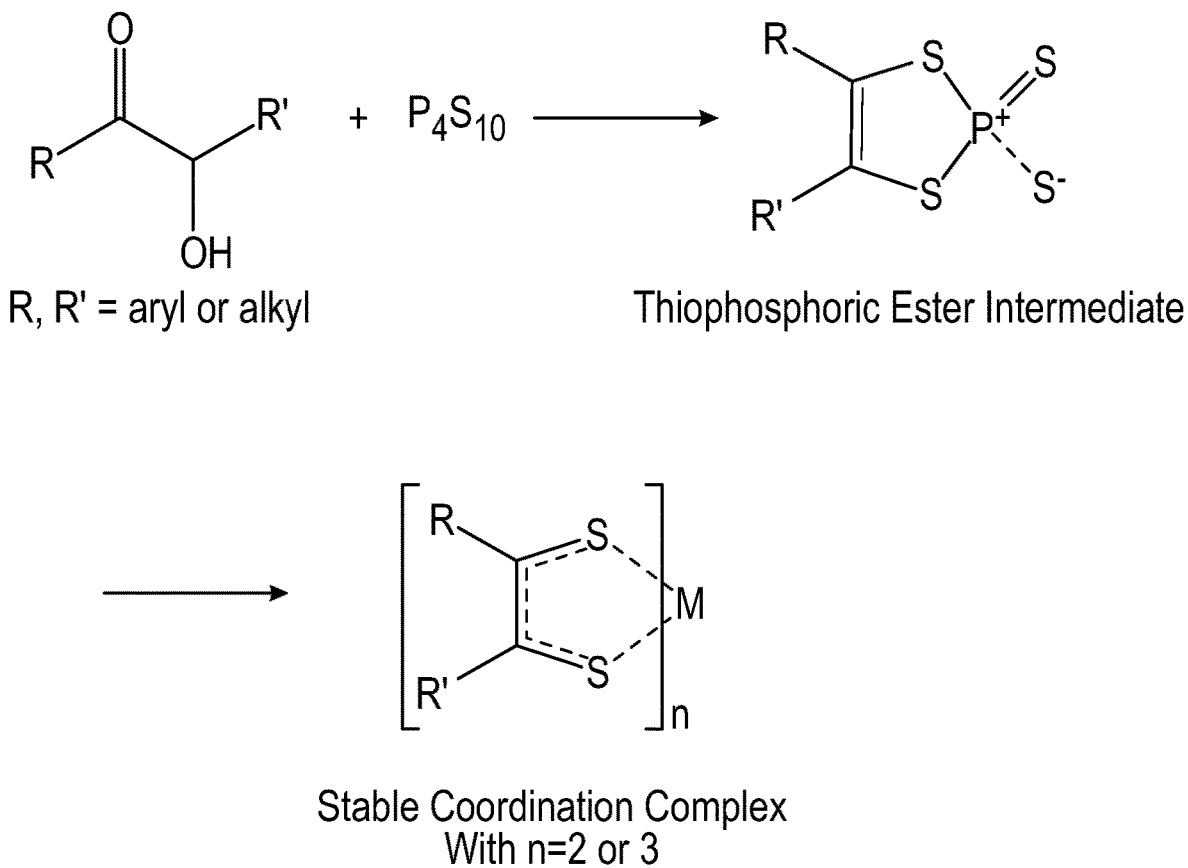
FIG. 5 shows a reaction scheme for the synthesis of an $M^{n+}$ based inhibitor, according to an embodiment of the present disclosure.

FIG. 5 shows an example synthesis pathway for obtaining the M(bis-dithione)$_n$ complex from a 2-hydroxy-1-one moiety-bearing molecule and phosphorous pentasulfide. A reaction of the 2-hydroxy-1-one moiety-bearing molecule and phosphorous pentasulfide undergoes to obtain a thiophosphoric ester intermediate. Subsequently, the thiophosphoric ester intermediate undergoes a chelation reaction with a metal cation that serves as the center of the coordination complex to obtain the M(bis-dithione)$_n$ complex. By way of example, synthesis of a M(bis-dithione)$_n$ complex $CoS_4C_4Ph_4$ (Ph denoting a phenyl group) involves reacting benzoin and phosphorous pentasulfide in the presence of xylene and nitrogen or argon via reflux at one hundred ten to one hundred forty deg. C. for two to twenty four hours to obtain a thiophosphoric ester intermediate. A subsequent reaction undergoes in the presence of xylene and nitrogen or argon via reflux using cobalt chloride or cobalt acetate to convert the intermediate and obtain the bis-dithiobenzil cobalt coordination complex. For the synthesis of $NiS_4C_4Ph_4$, $PdS_4C_4Ph_4$, and $PtS_4C_4Ph_4$, a dioxane solvent can be used in lieu of xylene.

In an embodiment, the hydrocarbon fluid occupying the fuel system 100 or the lubrication system 200 includes the isolated form of the organometallic chemistry-based compound or the $M^{n+}$ based inhibitor pre-dissolved or pre-suspended at a certain concentration. In this manner, it will be understood that the organometallic chemistry-based compound or the $M^{n+}$ based inhibitor can be an additive put into fuel or lubricant before loading onto the aircraft 10. Alternately, the fuel system 100 or the lubrication system 200 includes the controlled release assembly 300 releasing the isolated form of the organometallic chemistry-based compound or the $M^{n+}$ based inhibitor in a controlled manner into the hydrocarbon fluid at a certain concentration.

In an embodiment, the organometallic chemistry-based compound or the $M^{n+}$ based inhibitor exists in the form of a functionalized surface. Instead of existing in isolated form, the metal-based contact surface serves as the metal center of the coordination complex where the inhibitor ligands are bonded thereto.

Figure 6:
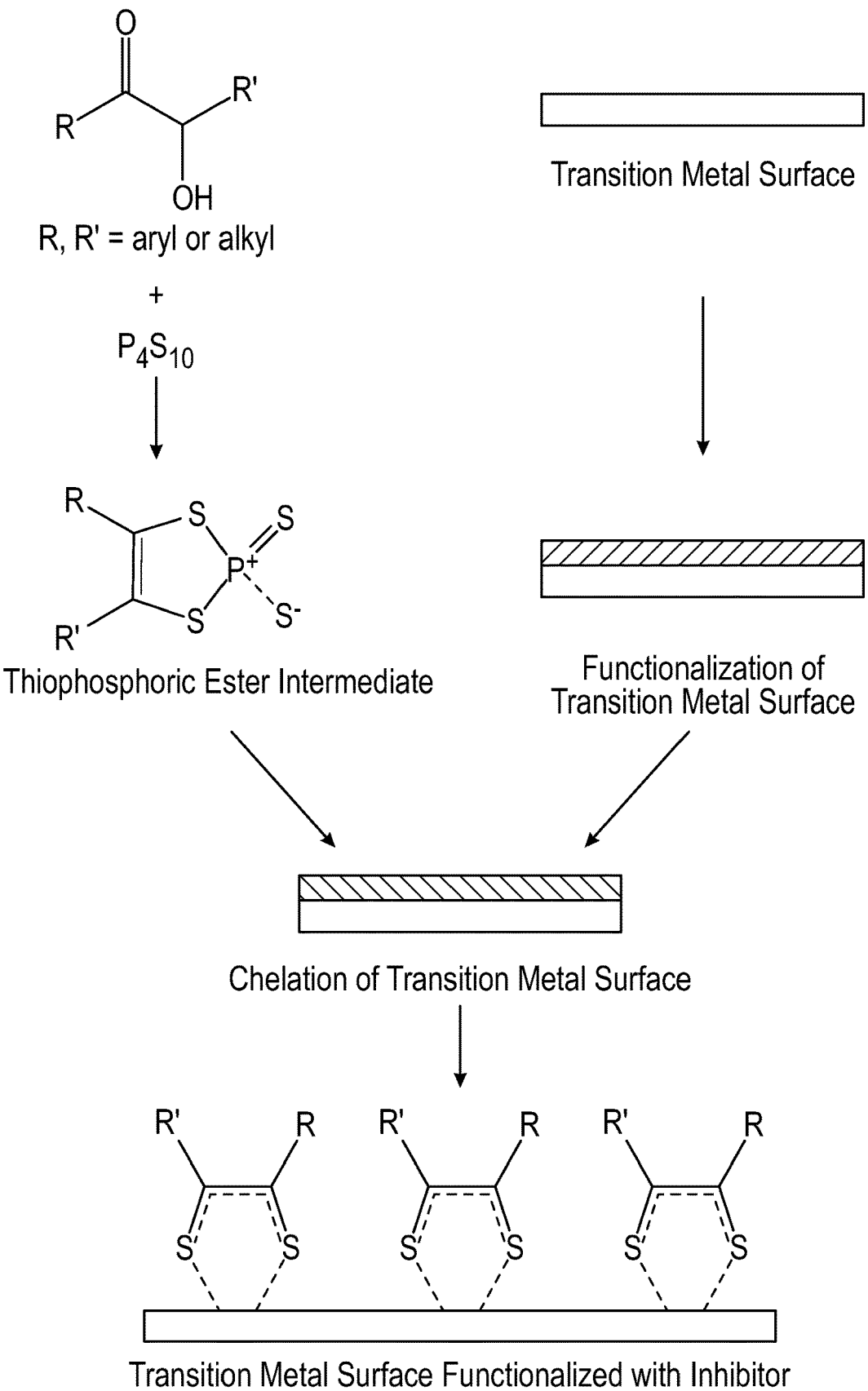
FIG. 6 shows a reaction scheme for the synthesis of an $M^{n+}$ based inhibitor, according to an embodiment of the present disclosure.

FIG. 6 shows an example synthesis pathway for functionalizing a metal surface with the inhibitor ligand to obtain an inhibitor ligand-functionalized surface. Similar to the synthesis pathway shown in FIG. 5, a reaction of a 2-hydroxy-1-one moiety-bearing molecule and phosphorous pentasulfide undergoes to obtain a thiophosphoric ester intermediate. The metal-based contact surface undergoes halide exposure (for example, chlorine gas) to obtain a halide-functionalized metal surface. Subsequently, chelation to the metal surface occurs as the thiophosphoric ester intermediate replaces the halide on the halide-functionalized metal surface, resulting in the metal surface functionalized with the inhibitor ligands.

In an embodiment, various components of the fuel system 100 or the lubrication system 200, including the tank 110, the fuel delivery assembly 120, the nozzle assembly 130, the oil tank 210, the lubrication-requiring components 220, and the oil pump 230, and/or any other component that is configured to be in contact with a hydrocarbon fluid, include the inhibitor ligands functionalized on the contact surface configured to be in contact with the hydrocarbon fluid.

In contemporary systems, coke deposits are formed on components, which must then be cleaned or replaced during maintenance intervals. Aspects of the present disclosure inhibit coke formation in systems such as aviation and land-based turbines. By inhibiting coke particle formation in the fuel or oil, coke deposits on surfaces are prevented in the overall system or circuit.

Advantageously, the organometallic chemistry-based compound or the $M^{n+}$ based inhibitor survives from decomposition over the wide range of operating temperatures and oxygen levels of the fuel system 100 or the lubrication system 200.

Further aspects of the present disclosure are provided by the subject matter of the following clauses.

An organometallic chemistry-based compound for preventing coke formation in a hydrocarbon fluid system, the organometallic chemistry-based compound including, a coordination complex of at least one of M(N-butylsalicylaldimino)$_n$, M(N-phenylsalicylaldimino)$_n$, M(3,5-diisopropylsalicylato)$_n$, [(N-butylphosphonium)$_m$M(dimethylglyoxime)]$^{n+}$, or M(bis-dithione)$_n$, where the organometallic chemistry-based compound or the $M^{n+}$ based inhibitor interrupts an autoxidative pathway of the coke formation under a temperature ranging between two hundred thirty to four hundred thirty deg. C.

The organometallic chemistry-based compound of the preceding clause, where M includes at least one of Ni, Co, Fe, Cu, Zn, V, Re, Pt, Pd, Os, Ru, Cr, Mo, or W.

The organometallic chemistry-based compound of any preceding clause, where the coordination complex is M(bis-dithione)$_n$ having a structure of,

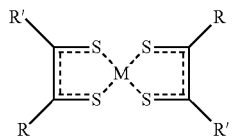

where each of R and R' are hydrogen or aryl or alkyl groups, substituted or unsubstituted.

The organometallic chemistry-based compound of any preceding clause, where the aryl or alkyl groups include at least one of phenyl, methyl, ethyl, n-propanyl, p-tolyl, p-anisyl, or p-ClC$_6$H$_4$.

The organometallic chemistry-based compound of any preceding clause, where the organometallic chemistry-based compound is present in a hydrocarbon fluid.

The organometallic chemistry-based compound of any preceding clause, where the hydrocarbon fluid includes at least one of Jet A, JetA1, JP-8, JP8+100, JP-5, SAF, lubrication oils used in aviation turbines, lubrication oils used in power turbines, or engine and gearbox lubrication oils used in automobiles.

The organometallic chemistry-based compound of any preceding clause, where the organometallic chemistry-based compound is released into the hydrocarbon fluid by a controlled release assembly.

The organometallic chemistry-based compound of any preceding clause, where the controlled release assembly includes a porous material including the M$^{n+}$ based inhibitor.

The organometallic chemistry-based compound of any preceding clause, where the controlled release assembly includes a semipermeable membrane enclosure, the semipermeable membrane enclosure encapsulating the M$^{n+}$ based inhibitor.

A fuel system for mitigating coke formation during delivery of a hydrocarbon fluid, the fuel system including, the organometallic chemistry-based compound of any preceding clause, a tank, a fuel delivery assembly fluidly connected downstream of the tank, and a nozzle assembly fluidly connected downstream of the fuel delivery assembly, where the organometallic chemistry-based compound is present in the hydrocarbon fluid.

The fuel system of any preceding clause, where the fuel delivery assembly includes a controlled release assembly to release the organometallic chemistry-based compound into the hydrocarbon fluid.

A lubrication system for mitigating coke formation during circulation of a hydrocarbon fluid, the lubrication system being a closed fluid circuit and including, the organometallic chemistry-based compound of any preceding clause, a tank, a pump, and a lubrication-requiring component, where the organometallic chemistry-based compound is present in the hydrocarbon fluid.

The lubrication system of any preceding clause, further including a controlled release assembly to release the organometallic chemistry-based compound into the hydrocarbon fluid.

A component configured to be in contact with a hydrocarbon fluid, the component including, a wall having a contact surface configured to be in contact with the hydrocarbon fluid, where the contact surface is functionalized with an inhibitor ligand to form an inhibitor ligand-functionalized surface, where the inhibitor ligand-functionalized surface interrupts an autoxidative pathway of coke formation under a temperature ranging between two hundred thirty to four hundred thirty deg. C.

The component of the preceding clause, where the contact surface includes at least one of a cobalt-chrome alloy, a cobalt-based alloy, a nickel-based alloy, or an iron-based alloy.

The component of any preceding clause, where the inhibitor ligand includes at least one of N-butylsalicylaldimino, N-phenylsalicylaldimino, 3,5-diisopropylsalicylato, butylphosphonium, dimethylglyoxime, or bis-dithione.

The component of any preceding clause, where the inhibitor ligand is the bis-dithione having a structure of,

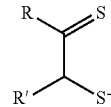

where each of R and R' are hydrogen or aryl or alkyl groups, substituted or unsubstituted.

A gas turbine engine including, a nozzle assembly, where the component of any preceding clause is the nozzle assembly and the contact surface is an interior surface of the nozzle assembly.

A fuel system for mitigating coke formation during delivery of a hydrocarbon fluid, the fuel system including, a tank, a fuel delivery assembly fluidly connected downstream relative to the tank, and a nozzle assembly fluidly connected downstream relative to the fuel delivery assembly, where the component of any preceding clause is one or more of the tank, the fuel delivery assembly, and the nozzle assembly, and the contact surface is an interior surface of the one or more of the tank, the fuel delivery assembly, and the nozzle assembly.

A lubrication system for mitigating coke formation during circulation of a hydrocarbon fluid, the lubrication system being a closed fluid circuit and including, a tank, a pump, and a lubrication-requiring component, where the component of any preceding clause is one or more of the tank, the pump, and the lubrication-requiring component, and the contact surface is an interior surface of the one or more of the tank, the pump, and the lubrication-requiring component.

A method for preventing coke formation in a hydrocarbon fluid system, the method including, introducing an organometallic chemistry-based compound into the hydrocarbon fluid system, where the organometallic chemistry-based compound includes a coordination complex of at least one of M(N-butylsalicylaldimino)$_n$, M(N-phenylsalicylaldimino)$_n$, M(3,5-diisopropylsalicylato)$_n$, [(N-butylphosphonium)$_m$M (dimethylglyoxime)]$^{n+}$, or M(bis-dithione)$_n$, where the organometallic chemistry-based compound interrupts an autoxidative pathway of the coke formation under a temperature ranging between two hundred thirty to four hundred thirty deg. C.

The method of the preceding clause, where M includes at least one of Ni, Co, Fe, Cu, Zn, V, Re, Pt, Pd, Os, Ru, Cr, Mo, or W.

The method of any preceding clause, where the coordination complex is M(bis-dithione)$_n$ having a structure of,

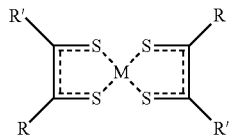

where each of R and R' are hydrogen or aryl or alkyl groups, substituted or unsubstituted.

The method of any preceding clause, where the aryl or alkyl groups include at least one of phenyl, methyl, ethyl, n-propanyl, p-tolyl, p-anisyl, or p-ClC$_6$H$_4$.

The method of any preceding clause, where the organometallic chemistry-based compound is present in a hydrocarbon fluid.

The method of any preceding clause, where the hydrocarbon fluid includes at least one of Jet A, JetA1, JP-8, JP8+100, JP-5, SAF, lubrication oils used in aviation turbines, lubrication oils used in power turbines, or engine and gearbox lubrication oils used in automobiles.

The method of any preceding clause, where the organometallic chemistry-based compound is released into the hydrocarbon fluid by a controlled release assembly.

The method of any preceding clause, where the controlled release assembly includes a porous material including the M$^{n+}$ based inhibitor.

The method of any preceding clause, where the controlled release assembly includes a semipermeable membrane enclosure, the semipermeable membrane enclosure encapsulating the M$^{n+}$ based inhibitor.

A method for preventing coke formation in a hydrocarbon fluid system, the method including, functionalizing a contact surface of a component with an inhibitor ligand to form an inhibitor ligand-functionalized surface, and injecting or circulating a hydrocarbon fluid into the hydrocarbon fluid system such that the contact surface is in contact with the hydrocarbon fluid, where the inhibitor ligand-functionalized surface interrupts an autoxidative pathway of coke formation under a temperature ranging between two hundred thirty to four hundred thirty deg. C.

The method of the preceding clause, where the contact surface includes at least one of a cobalt-chrome alloy, a cobalt-based alloy, a nickel-based alloy, or an iron-based alloy.

The method of any preceding clause, where the inhibitor ligand includes at least one of N-butylsalicylaldimino, N-phenylsalicylaldimino, 3,5-diisopropylsalicylato, butylphosphonium, dimethylglyoxime, or bis-dithione.

The method of any preceding clause, where the inhibitor ligand is the bis-dithione having a structure of:

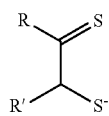

where each of R and R' are hydrogen or aryl or alkyl groups, substituted or unsubstituted.

Although the foregoing description is directed to the various exemplary embodiments, it is noted that other variations and modifications will be apparent to those skilled in the art, and may be made without departing from the spirit or the scope of the disclosure. Moreover, features described in connection with one embodiment may be used in conjunction with other embodiments, even if not explicitly stated above.

We claim:

1. A hydrocarbon fluid comprising an organometallic chemistry-based compound for preventing coke formation in a hydrocarbon fluid system, the organometallic chemistry-based compound being present in the hydrocarbon fluid and including:
   a coordination complex of at least one of M(N-butylsalicylaldimino)$_n$, M(N-phenylsalicylaldimino)$_n$, M(3,5-diisopropylsalicylato)$_n$, [(N-butylphosphonium)$_m$M(dimethylglyoxime)]$^{n+}$, or M(bis-dithione)$_n$, wherein the organometallic chemistry-based compound interrupts an autoxidative pathway of the coke formation under a temperature ranging between two hundred thirty to four hundred thirty deg. C.,
   wherein M comprises at least one of Ni, Co, Fe, Cu, Zn, V, Re, Pt, Pd, Os, Ru, Cr, Mo, or W,
   wherein n is 2 or 3, and
   wherein the organometallic chemistry-based compound is released into the hydrocarbon fluid by a controlled release assembly.

2. The hydrocarbon fluid of claim 1, wherein the coordination complex is M(bis-dithione)$_n$ having a structure of:

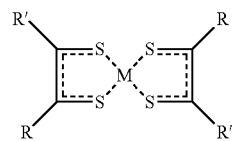

where each of R and R' are hydrogen or aryl or alkyl groups, substituted or unsubstituted.

3. The hydrocarbon fluid of claim 2, wherein the aryl or alkyl groups comprise at least one of phenyl, methyl, ethyl, n-propanyl, p-tolyl, p-anisyl, or p-ClC$_6$H$_4$.

4. The hydrocarbon fluid of claim 1, wherein the hydrocarbon fluid is at least one of Jet A, JetA1, JP-8, JP8+100, JP-5, SAF, lubrication oils used in aviation turbines, lubrication oils used in power turbines, or engine and gearbox lubrication oils used in automobiles.

5. The hydrocarbon fluid of claim 1, wherein the controlled release assembly comprises a porous material comprising the organometallic chemistry-based compound.

6. The hydrocarbon fluid of claim 1, wherein the controlled release assembly comprises a semipermeable membrane enclosure, the semipermeable membrane enclosure encapsulating the organometallic chemistry-based compound.

7. A fuel system comprising:
   a fuel tank storing the hydrocarbon fluid of claim 1 and the hydrocarbon fluid being a fuel;
   a fuel delivery assembly fluidly connected to the fuel tank to receive the fuel from the fuel tank; and
   a nozzle assembly fluidly connected to the fuel tank by the fuel delivery assembly to receive the fuel.

8. A lubrication system comprising:
   a tank storing the hydrocarbon fluid of claim 1;
   a pump; and
   a lubrication-requiring component, wherein the tank, the pump, and the lubrication-requiring component are fluidly connected to each other in a closed fluid circuit to circulate the hydrocarbon fluid therebetween.

9. The hydrocarbon fluid of claim 1, wherein ligands of the coordination complex are functionalized on a contact surface of a wall to form an inhibitor ligand-functionalized surface, the contact surface of the wall configured to be in contact with the hydrocarbon fluid.

* * * * *